United States Patent

[11] 3,584,699

| [72] | Inventor | Joseph A. Urick<br>5036 Northlawn Drive, Murrysville, Pa. 15668 |
|---|---|---|
| [21] | Appl. No. | 842,227 |
| [22] | Filed | July 16, 1969 |
| [45] | Patented | June 15, 1971 |

[54] VEHICLE TRACTION DEVICE
3 Claims, 9 Drawing Figs.

[52] U.S. Cl. .................................................. 180/15, 180/72
[51] Int. Cl. .................................................. B62d 59/04
[50] Field of Search .................................................. 180/14, 15, 11, 12, 16, 72, 22 A, 22 B; 280/460, 432

[56] References Cited
UNITED STATES PATENTS

| 843,796 | 2/1907 | Culver | 180/72 |
| 1,095,888 | 5/1914 | Kjus | 180/14 |
| 1,390,986 | 9/1921 | Dain | 180/44 UX |
| 1,598,078 | 8/1926 | Hancock | 180/14 |
| 2,216,584 | 10/1940 | Boden | 280/460 |
| 2,712,856 | 7/1955 | MacPhee | 180/15 |
| 2,800,972 | 7/1957 | Jacobson et al. | 180/72 |

Primary Examiner—Kenneth H. Betts
Attorney—E. Strickland

ABSTRACT: A device for increasing the tractive effort of a powered vehicle, the device including a set of additional wheels attached to and supporting a rigid frame coupled to the vehicle in axial, following alignment therewith. Drive chains and sprockets are provided for mechanically connecting the drive wheels of the vehicle to the additional wheels for driving same when power is applied to the drive wheels of the vehicle.

VEHICLE TRACTION DEVICE

BACKGROUND OF THE INVENTION

The present invention relates to powered vehicles, and particularly to a relatively simple and economical means for substantially increasing the tractive effort of such vehicles.

It is generaLLY well known that in order to propel a vehicle along a travel surface by one or more drive wheels, friction must be developed between the travel surface and that portion of the wheel (or tire) engaging the travel surface. This friction has generally become known as traction or tractive effort; it is in this context that the words traction and tractive effort are hereinafter employed.

Friction (and traction) is dependent upon the downward force or weight with which the wheel or tire is pressed against the travel surface. It is for this reason that relatively lightweight vehicles having more than adequate power for moving substantial loads are unable to move such loads because their drive wheels spin or slip on the travel service. This has been noticed particularly by owners and users of the garden type of tractor.

Heretofore, in order to increase traction and, thus increase the load weight a relatively lightweight vehicle can move without the drive wheels thereof slipping, manufacturers and owners of such vehicles have employed companion or dual drive wheels, i.e., an additional wheel attached directly to the hub of each drive wheel in a side-by-side manner. Such wheels are rigidly fixed to the drive wheels, and thus to the drive axle of the vehicle, so that one wheel can be instrumental in raising the other, companion wheel up and out of contact with the ground, for example, when one wheel rides over irregular terrain or over a stone or other object lying in its path of travel. As can be readily appreciated, with one wheel raised above the surface of the ground, the tractive effort offered by the raised wheel is zero.

Another disadvantage of side-by-side dual wheels is that they increase considerably the tract width of the vehicle which again can often defeat the advantage of the additional traction offered by the wheels. For example, a snow blower or plow operated by the vehicle may provide a path in the snow that is the approximate width of the tractor without dual wheels. When the dual wheels are added, the width of the vehicle may be increased beyond the width of the path provided by the blower or plow so that the outer wheels of the dual wheels ride in and on unplowed snow. Thus, the added wheels can actually reduce the tractive effort of the drive wheels of a vehicle.

BRIEF SUMMARY OF THE INVENTION

The present invention provides a relatively simple and economical means for substantially increasing the traction of a vehicle without increasing the overall width of the vehicle, and in a manner to provide constant continuous contact of all drive wheels with the ground. This is accomplished by two additional drive wheels located in following alignment with the vehicle. The additional drive wheels are mechanically connected to the vehicle drive wheels to be driven thereby, the additional wheels being maintained in following alignment with the vehicle by a frame attached to the wheels and conveniently coupled to the vehicle. In this manner, the additional drive wheels are free to follow the contour of the travel terrain thereby providing a constant continuous additional tractive effort for the vehicle, yet do not increase the overall width of the vehicle as is the case with conventional dual wheels. In addition to the considerable increase in traction provided by the additional wheels, the frame and wheels offer a vehicle for hauling loads, the weight of such loads adding further to the tractive effort of both vehicles.

BRIEF DESCRIPTION OF THE DRAWINGS

The invention, along with its objectives and advantages, will be best understood by reading the following detailed description in connection with the accompanying drawings in which.

DESCRIPTION OF THE PREFERRED EMBODIMENT

Figure 1:
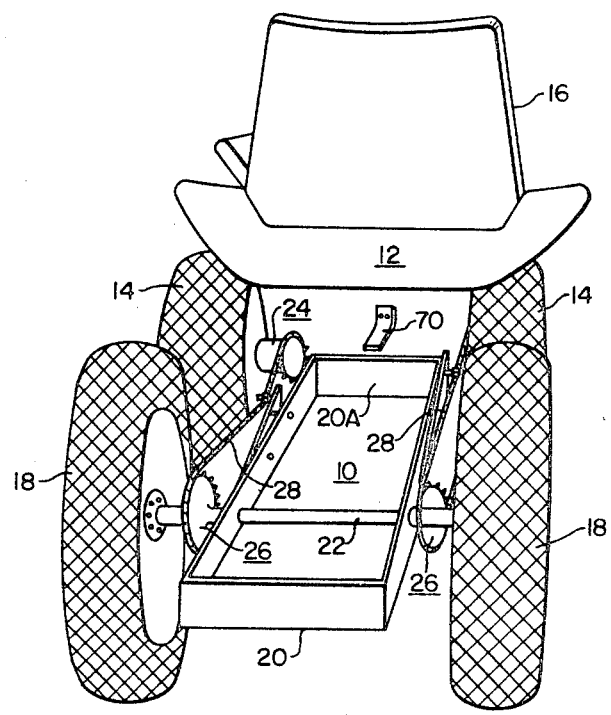
FIG. 1 is a perspective view of a traction device constructed in accordance with the principles of the invention.

Specifically, FIG. 1 shows in perspective, the traction device of the present invention operatively coupled to the rear of a tractor 12, the traction device being generally designed by the numeral 10. In the view of FIG. 1, the only visible portions of the tractor are its rear drive wheels and tires 14 and an operator's seat 16. The tractor is powered by a prime mover, such as a gasoline engine (not shown), located adjacent the front of the tractor.

In accordance with the invention, the traction device 10 comprises essentially two additional drive wheels 18, a rigid frame 20 attached to said wheels via an axle 22, and two front and rear sprocket devices 24 and 26 respectively mechanically coupled together by two drive chains 28. The front sprockets are associated with the drive wheels of the vehicle 10 while the rear sprockets are associated with the additional drive wheels in manners presently to be explained.

Figure 2:
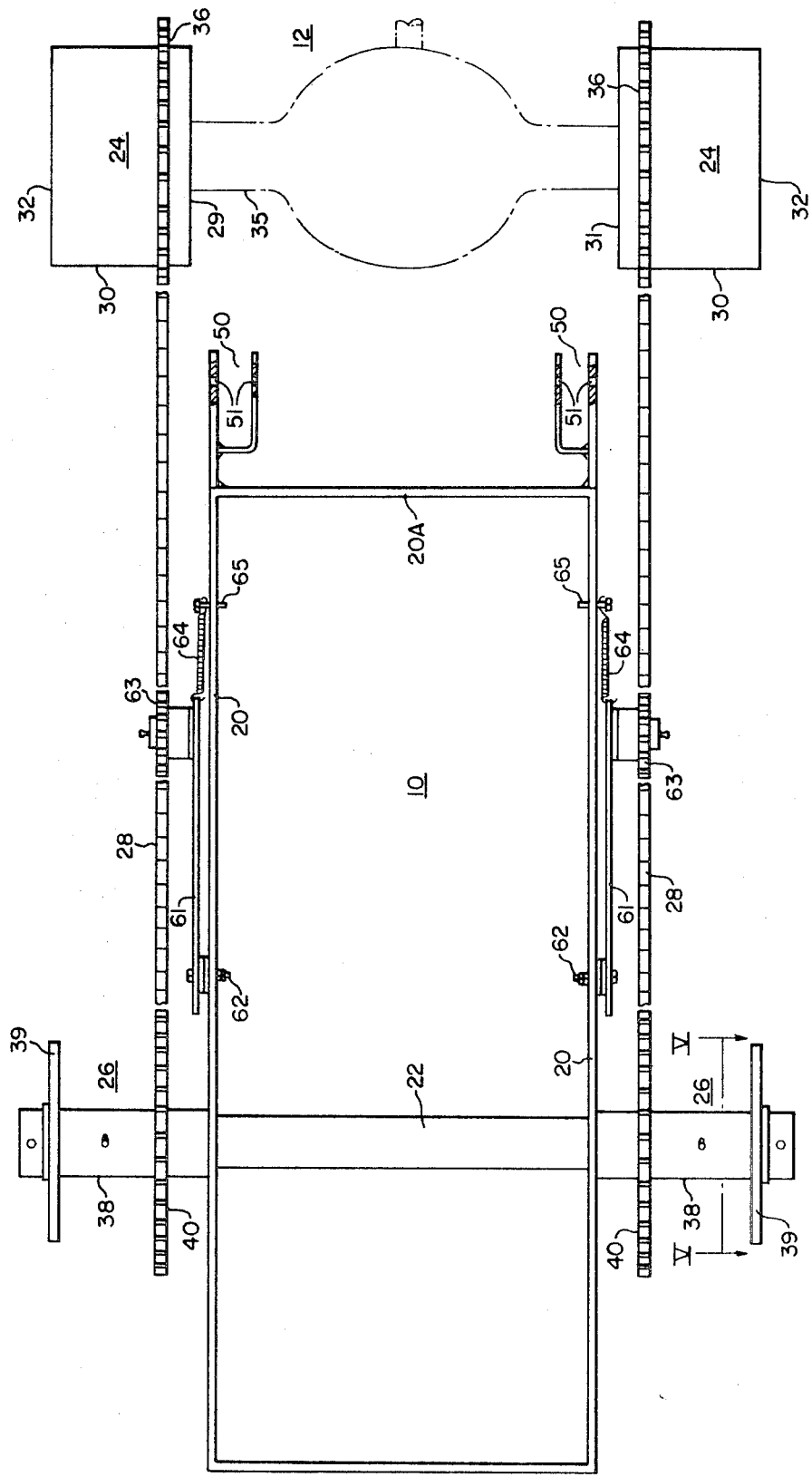
FIG. 2 is a plan view of the device shown in FIG. 1.

The frame 20 may be made in any suitable manner, and from any suitable material. In FIGS. 1 and 2, flat bar stock is used in a manner to form a rectangular shaped frame. The axle 22 extends across the narrow dimension of the frame, and may extend through the bar stock forming the long sides of the frame as shown in FIG. 1. The axle is fixed to the frame in a suitable manner, for example, by a weld where the axle extends through the bar stock.

Figure 6:
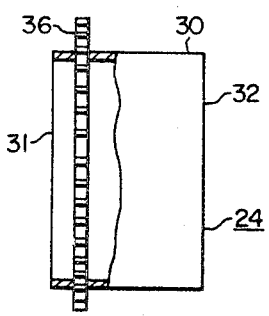
FIGS. 6 and 6A are respectively side and end elevation views of an additional hub means employed in the invention.
Figure 6A:
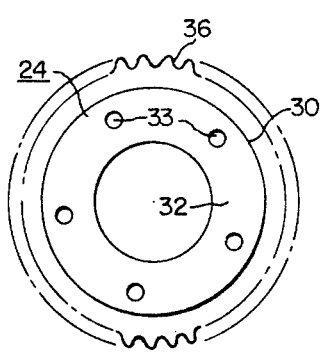

The front sprockets 24 are constructed to attach to the drive axles of the tractor 10 in the manner indicated in FIG. 2. More particularly, each front sprocket comprises basically a main cylinder structure 30 (FIG. 6) having an open end 31 at one end thereof, and an end wall portion 32 at the opposite end thereof. The end wall is provided with holes 33 (FIG. 6A) circumferentially spaced apart to accommodate the studs of the axle flanges (not shown) located at the ends of an axle housing 35 (FIG. 2) of the tractor. In this manner, the sprocket cylinders are attached to the axle flanges with the wheels 14.

Adjacent the open end 31 of the sprocket cylinder 24 and about the cylinder wall is located a sprocket ring 36 which forms an integral part of the cylinder. The ring may be fabricated separately from the cylinder and then attached thereto by welding, for example, or the ring may be integrally formed with the cylinder when the cylinder is made.

To attach the sprocket cylinders 24 to the axle flanges, the wheels 14 are first removed, and the cylinders disposed on the flanges (the flange studs entering the holes 33 in the end wall 32) by slipping the open end 31 of the cylinder over the ends of axle housing 35 as shown in FIG. 2. The wheels are then returned and secured in place against the cylinders by the studs and bolts in the conventional manner.

The rear sprockets 26 each include a cylindrical body portion 38 (FIG. 2) having an integral hub flange or disc 39 located adjacent one end thereof, and an integral sprocket flange or disc 40 located adjacent the opposite end of the cylinder. The hub and sprocket flanges may be fabricated separately from the cylinder 38 and then attached thereto by welding, for example, on the flanges formed together with the cylinder.

Figure 5:
FIG. 5 is a cross-sectional view of a hub means employed in the invention and taken along lines V–V of FIG. 2.

As shown in FIG. 2, the sprockets 26 are disposed respectively on the ends of the axle for rotation thereon. The inside surface of the cylindrical portion 38 may serve as a bearing surface in direct contact with the surface of the axle, or, a sleeve bearing 42 may be disposed between the sprocket and the axle as shown in cross section in FIG. 5. As further shown in FIG. 5, circumferentially spaced apart holes 44 are provided in the hub flange 39, the holes providing means for receiving bolts or studs for securing the additional drive wheels to the flange and thus to the axle 22.

The sprockets 24 are respectively connected to the sprockets 26 by the two chains 28 as shown in FIGS. 1 through 3B. The chains may be connected and disconnected by a connecting link 46 (FIG. 3) connected in the chain 28, the link 46 being shown in an enlarged plan view for purposes of illustration. The link is preferably a type Am. Std. No. 50 made by the Diamond Chain Company, in which one side of the link can be removed from pins 47 of the link by hand, and then redisposed on the pins after they have been inserted through corresponding holes in the loose ends of the chain. The link is held together by a spring clip 48 which is split at one end, the clip being disposed over the removable side of the link and in engagement with slotted ends (not shown) of the pins 47 after the link is attached to the chain. Like the removable side of the link, the clip can be attached and removed by hand.

Figure 4:
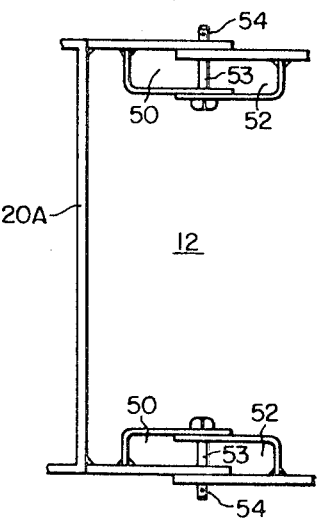
FIG. 4 is a plan view of a vehicle-coupling means useful in the invention.

The traction device 10 is directly coupled to the rear of the tractor 12, and this may be accomplished by any suitable coupling means. In the embodiment of the invention shown in FIGS. 2 through 4, the coupling means comprise two U-shaped arms 50 suitably attached (at spaced-apart locations) to the forward end of the frame 20. The arms may be attached to the frame, by welding, for example. The arms 50, provided with aligned openings 51, correspond to two similar U-shaped structures 52 (FIG. 4) suitably attached to the tractor. When it is desired to couple the traction device to the tractor, the arms 50 and 52 are brought together in a manner to align their corresponding openings. Pins 53 are then inserted through the openings, as shown in FIG. 4, to secure the traction device to the tractor as shown in FIG. 1.

Figure 3A:
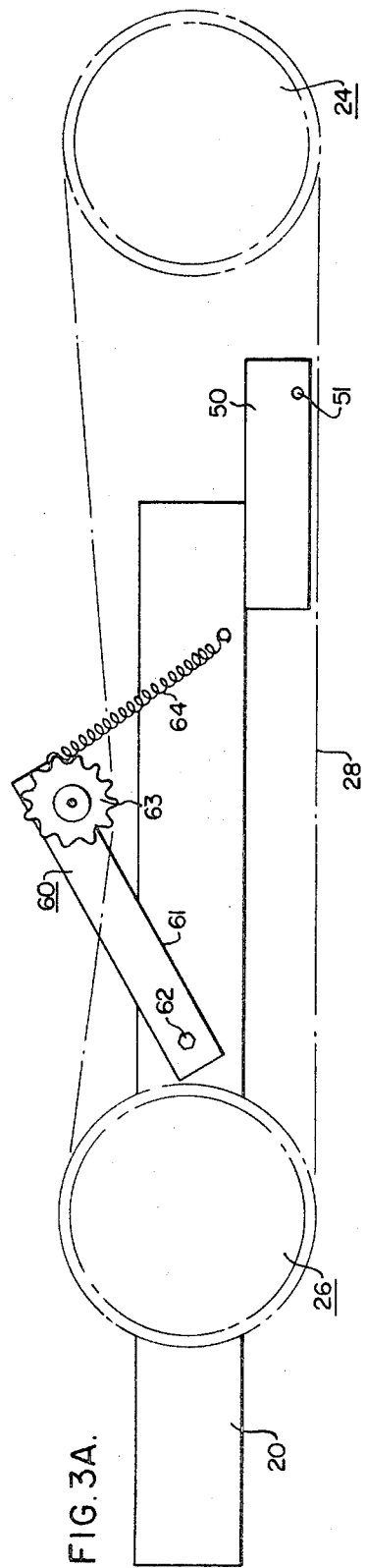
FIGS. 3A and 3B show different positions of the tension means of FIG. 3 during operation of the traction device.
Figure 3:
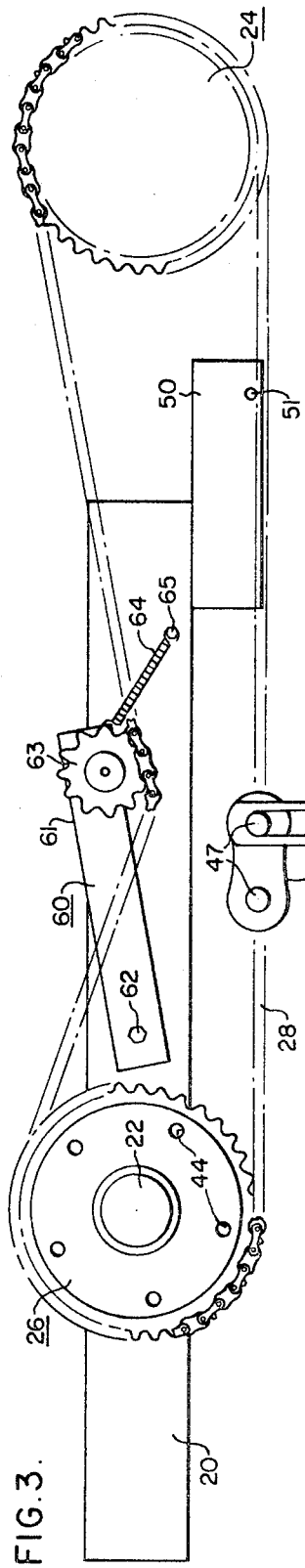
FIG. 3 is a side elevation view of the device of FIG. 2 showing a drive chain and tension means employed in the invention.
Figure 3B:
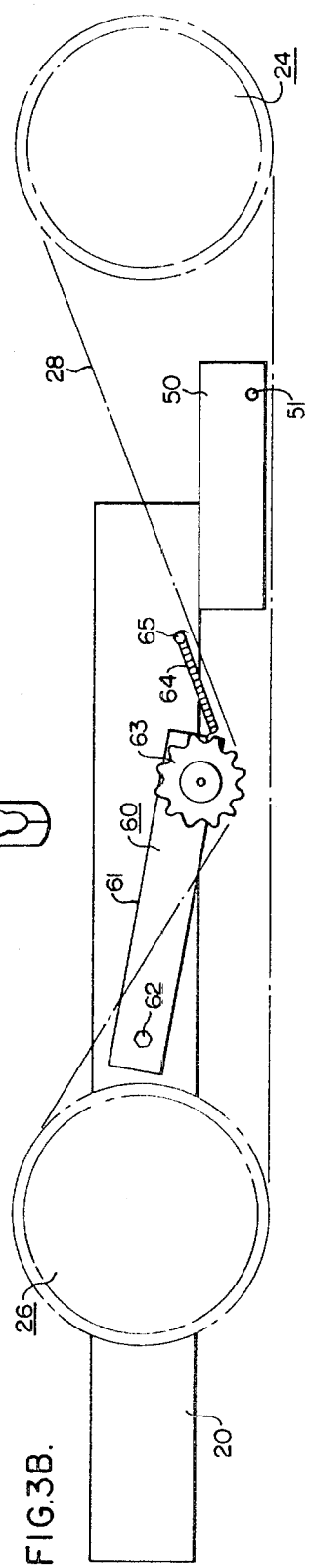

In FIGS. 3 to 3B, the arms 50 are shown attached to the bottom edge of the frame 20. Such a structure is given by way of illustration only, the position of the arms, or other suitable coupling structures, being dependent upon the location and type of coupling structure provided on the vehicle with which the traction device 10 is to be used. However, two spaced-apart coupling locations, as shown in FIG. 4, for example, provide greater stability for the traction device in comparison to a single type of hitch or coupling.

When it is desired to use the traction device 10, the drive wheels 14 of the vehicle with which it is used, are provided with the sprocket cylinders 24 as shown in FIGS. 1 and 2, and in the manner described above. The chains 28 are disposed about the sprockets 24 and 26, and connected together by the coupling links 46. The frame is coupled to the tractor via the coupling arms 50 and 52 and the pins 53 as shown in FIG. 4. (The pins may be secured by carter pins [not shown] disposed in holes 54 provided in the ends of the pins through other means may be used to secure the pins 53 in the coupling arms.) In this manner, when power is applied to the drive wheels of the vehicle the sprockets and chains conduct this power to the additional drive wheels 18 thereby providing the vehicle with the additional tractive effort of the wheels 18.

In using and testing the traction device 10, the additional traction gained thereby was found to be substantial over that of say side-by-side dual wheels for the reasons previously given, namely, the traction device of the present invention is allowed to follow the contour of the surface over which the vehicle 12 travels thereby providing constant, continuous contact of all drive wheels with said surface. And this was accomplished with no needed increase in the overall tract width of the vehicle as would be the case with conventional dual wheels.

The preferred embodiment of the invention has thus far been described with reference to sprockets and drive chains as the means for transmitting the power of the vehicle 12 to the additional drive wheels 18, and thereby providing the vehicle with the substantial increase in traction. The invention, however, may employ belts and pulleys respectively in place of the sprockets 24, 26 and chains 28 through the latter have certain advantages over the former. For example, chains are not subject to slippage and stretching in the manner of belts.

The drive chains 28, as best seen in FIGS. 3, 3A and 3B, may be provided with tensioning devices, generally designated 60, which function to maintain the chains relatively taut during operation of the traction device 10. Each tension device comprises an arm 61 attached to and pivoted on the outside of the frame 20 by a suitable bolt or pin 62. Adjacent the end of the arm opposite the pivot pin 62 is disposed a relatively small sprocket wheel 63 mounted for rotation on said arm and for engagement with the chain 28 as best seen in FIG. 3. To maintain the sprocket wheel 63 in engagement with the chain, a spring 64 is provided, the spring having one end connected to the end of the arm supporting the sprocket wheel, and the other end of the spring suitably attached to the frame at 65.

In FIG. 3, the chain 28 and tensioning means 60 are shown in an essentially normal position with the wheels and sprockets of the tractor 12 and the traction device 10 in essentially the same vertical plane. In operation, however, the two are not always in the same plane because of the unevenness of the surface over which they travel. When one falls below the other, the chains temporarily lighten or loosen as the chains attempt to equalize about their respective sprockets. As shown in FIG. 3A, the chain tightens and thus the upper portion of the chain tends to rise when the wheels 18 of the traction device fall below those of the tractor; when the wheels 14 of the tractor are below those of the traction device, the chain loosens, the upper portion thereof tending to lower as shown in FIG. 3B. As further shown in FIGS. 3A and B, the tensioning devices 60 travel with the rise and fall of the chains thereby maintaining the chains taut when they would otherwise be loose yet also allowing them to temporarily tighten when necessitated by the travel of the traction device 10 and the tractor 12 over irregular terrain.

When a tractor is climbing a steep grade, the forward torque of the rear wheels can force the tractor over on itself and the operator. In order to prevent this from happening, the present invention includes a rigid L-shaped member 70 suitably attached to the rear of the tractor as shown in FIG. 1. The L-shaped member extends out and over the front bar 20A of the frame 20 so that when the front of the tractor begins to rise, the tractor thus pivoting about the rear wheels 14, the L-shaped member engages the front of the frame thereby preventing the tractor from further upward movement. The member 70 need not, of course, be L-shaped; any suitably shaped, rigid member capable of withstanding the driving force of the tractor, and extending over the frame will prevent the tractor from coming over on itself.

From the foregoing description, it should now be apparent that a new and useful traction device has been disclosed in which considerable tractive effort can be added to a vehicle in a relatively simple yet reliable manner. This is accomplished by the use of two additional drive wheels attached to a vehicle in alignment therewith by a suitable frame attached to the wheels and coupled to the vehicle. Power is conducted to the additional wheels preferably by sprocket devices respectively associated with the drive wheels of the vehicle and the additional wheels, and two drive chains respectively mechanically connecting the sprockets of the vehicle drive wheels with those of the additional wheels. In this manner, a traction device is provided which does not increase the track width of the vehicle and which follows the contour of the path of travel of the vehicle thereby insuring that all four drive wheels remain in constant continuous contact with the travel surface.

Through the invention has been described with a certain degree of particularity, changes may be made therein without departing from the spirit and scope thereof.

Having thus described my invention and certain embodiments thereof, I claim:

1. A device for substantially increasing the traction of a vehicle having at least two drive wheels, the device comprising a rigid frame adapted to be coupled to said vehicle, at least two additional drive wheels attached to and supporting said frame in following alignment with the drive wheels of said vehicle, and drive means respectively mechanically connecting the drive wheels of said vehicle to said two additional drive wheels for driving same when power is applied to the drive wheels of said vehicle, said drive means including a sprocket respectively, physically attached to each of the drive wheels, the sprockets attached to the additional drive wheels being in respective following alignment with the sprockets fixed to the drive wheels of said vehicle, chain means engaging said sprockets and extending respectively between the sprockets of the drive wheels of said vehicle and the sprockets of the additional drive wheels, and each of said sprockets attached to the drive wheels of the vehicle including a cylindrical body having an end wall portion provided with circumferentially spaced apart holes, said holes being positioned to accommodate wheel studs provided to secure the vehicle drive wheels to a drive axle of the vehicle.

2. The device described in claim 1 in which the sprockets attached to the additional drive wheels each include a cylindrical main body portion, a flange hub portion fixed to said body portion adjacent one end thereof, and a sprocket portion attached to said body portion adjacent the other end thereof, an additional drive wheel being attached to said flange hub portion.

3. The device described in claim 2 including an axle attached to the rigid frame, said axle extending through the cylindrical body portions of the sprockets attached to the additional drive wheels.